Oct. 15, 1935.          G. S. WITHAM, JR          2,017,225
 METHOD AND APPARATUS FOR DETERMINING, RECORDING AND CONTROLLING THE
   DENSITY, CONSISTENCY OR SPECIFIC GRAVITY OF FLUENT MATERIALS
                    Filed May 14, 1931
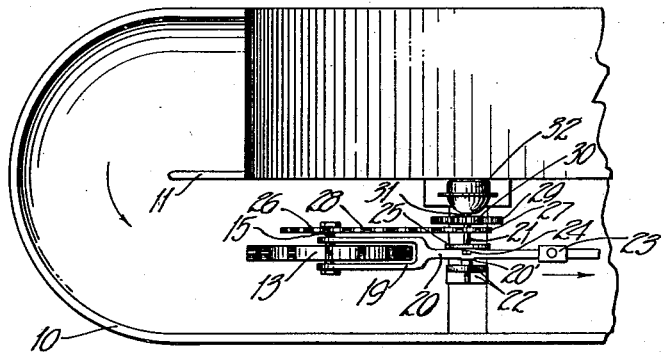
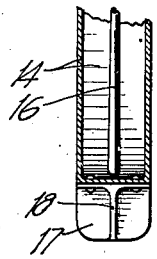
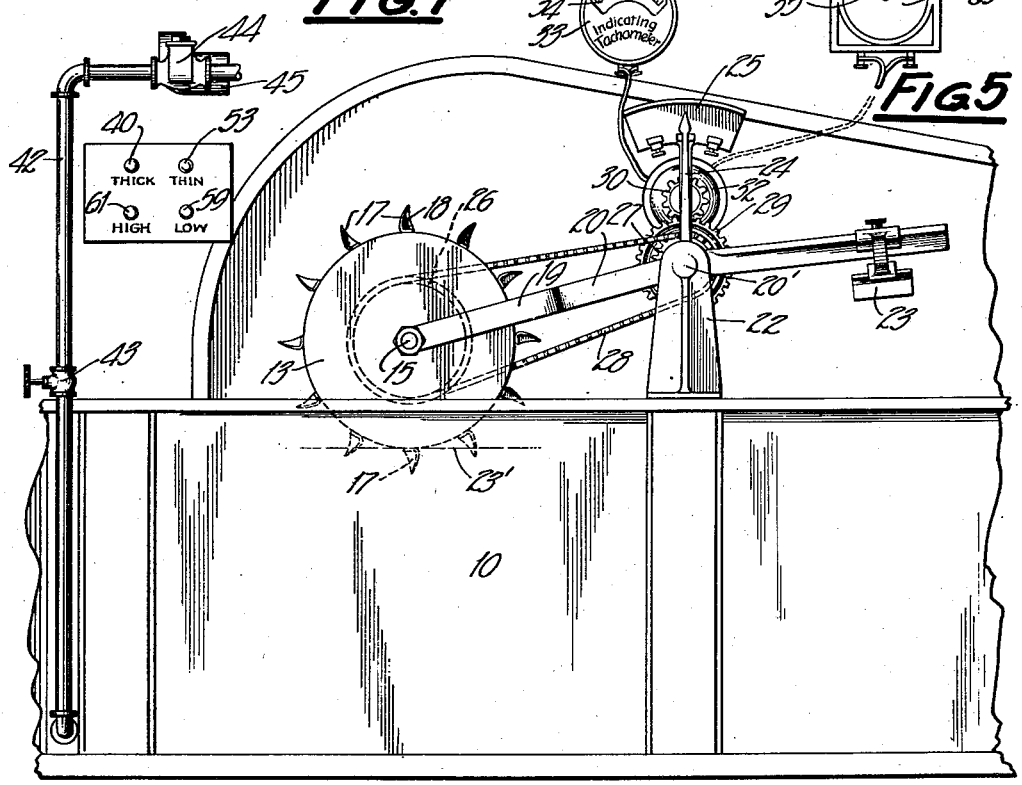
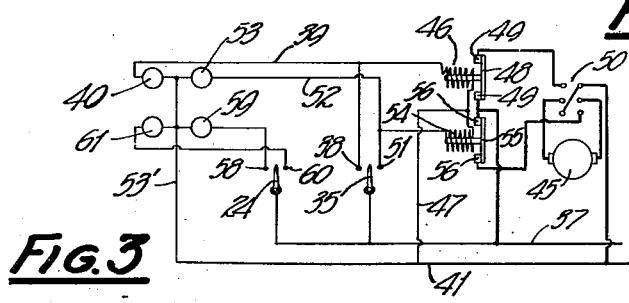
INVENTOR
George S. Witham Jr.
By
ATTORNEYS Patented Oct. 15, 1935

2,017,225

UNITED STATES PATENT OFFICE 2,017,225

METHOD AND APPARATUS FOR DETERMINING, RECORDING, AND CONTROLLING THE DENSITY, CONSISTENCY, OR SPECIFIC GRAVITY OF FLUENT MATERIALS

George S. Witham, Jr., Lincoln, N. H.

Application May 14, 1931, Serial No. 537,342

23 Claims. (Cl. 92—46)

My invention more particularly relates to a method and apparatus for indicating and/or recording the density, consistency or specific gravity of a liquid or a fluent liquid mixture such as paper stock, syrups, oils, dough mixtures, paints and the like.

It is especially adapted for maintaining or producing a fluent material of uniform density, consistency or specific gravity by utilizing the resistance to flow of such material for the purpose of ascertaining any of the above characteristics. While my invention is to be understood as in no way limited to the paper making industry, in describing my means and method of procedure I will explain its application thereto merely as one specific example of its many uses.

Until within recent years the preparation of stock for paper machines has been conducted in batches. For example, it has been usual to fill a beater and circulate the stock therein until the batch has been completely treated and then dump it and refill with another batch. With the development of so-called extractors, such as described in my U. S. Patent No. 1,722,693, it has become possible to maintain a continuous flow of material through the beaters. That is, stock is constantly introduced through suitable supply lines or otherwise, and particles of stock which are reduced to a predetermined size or which have been treated to a predetermined extent are continuously removed from the general mass undergoing treatment by means of selectors or extractors. In such cases it is difficult to maintain the stock in the beater at a uniform consistency which is of great importance not only in maintaining an efficient operation of the entire system but also in the production of a uniform product. It is also of great importance in duplicating the properties of a given paper such as color, texture, bulk and character, inasmuch as it is impossible to do this without using stock of a predetermined, uniform consistency.

Where a flow of any material is maintained by a constant impelling force, such as by gravity or other means, I have found that the speed at which it travels in any circulating container, depends upon the height or depth of the material in the container and its consistency. If the height or depth is maintained at any substantially constant level the rate of travel of the material in any given container varies inversely with its consistency. Therefore, any device which will measure, indicate or record variations in the rate of travel may be calibrated in units of material density or consistency and thus be utilized to measure, indicate, or record, this characteristic of the material. Slight variations in density, I find, produce comparatively large variations in speed of travel of the material. For example, in breaker beaters of standard type with a stock consistency of about 3% the surface travel of the stock will be about 100 to 150 feet per minute. If the consistency is increased to 5%, the rate of surface travel will be reduced to from 30 to 40 feet per minute.

One of the objects of my invention is to provide a method and apparatus, whereby the consistency of the material in a container in which a flow thereof is created, may be very closely regulated either automatically or by manual operation. Another object is to provide a means whereby an hour to hour graphic history of the treatment of the material will be recorded, which will not only show when the treatment is stopped and started but will also indicate the variations in the consistency of the material being treated. With these objects in view my invention includes the method hereinafter set forth and the novel elements and the combinations and arrangements thereof described below and illustrated in the accompanying drawing in connection with a beating engine and in which—

Fig. 1 is a fragmentary plan view of the tub of a breaker beater with a rotatable member and the parts operable thereby mounted in the channel of the tub opposite the beater roll;

Fig. 2 is a side view of Fig. 1;

Fig. 3 is a diagram of electrical connections;

Fig. 4 is a fragmentary sectional view through the rotatable floating wheel, and Fig. 5 is an elevation view of a recording tachometer for making a graphic record of the operation of the beater including variations in density of the stock.

Like reference characters indicate like parts throughout the drawing.

Referring now to the drawing, 10 is a beater tub provided with the usual midfeather 11 defining a channel in which the stock is circulated as indicated by the arrows and in one portion of which channel a rotatable floating member 13 is located. The rotatable member 13, in the embodiment illustrated, is hollow and may comprise a suitable light metal enclosure 14 surrounding the shaft 15 and forming a fluid tight joint therewith, the enclosure being supported on a suitable frame 16 secured to the shaft 15. The enclosure 14 is provided on its periphery with a plurality of paddles 17 preferably formed of light metal and provided with reinforcing ribs 18. In operation the paddles cut down into the stock sufficiently to drive the paddle wheel at practically the same speed as the surface travel of the stock. The shaft 15 of the paddle wheel is mounted in the yoke 19 of an arm 20 pivoted at 20' on the bearing of shaft 21 which is supported in standards 22. The arm 20 is counterweighted, as at 23, so that it is substantially balanced when the periphery of member 13 rests on the surface, 23' of the stock. Attached to the shaft 21 is an arm 24 which indicates on a dial 25 the vertical position of the rotatable member and accordingly the depth of the stock in the channel of the tub.

In accordance with my invention means operable by the rotatable member 13 are also provided for indicating the density of the stock within the tub of the beater engine, or other container, it being understood that the device is operable by the flow of the stock, and that variations in the rate of flow indicate variations in stock density because density is a function of the rate of flow.

In the embodiment of my invention illustrated, a sprocket wheel 26 is secured on the shaft 15. A sprocket wheel 27 is fixed on the shaft 21 and is rotated from the sprocket wheel 26 by a chain 28. A gear wheel 29 is also fixed on the shaft 21 and meshes with a pinion 30 which, in turn, is mounted on a shaft 31 (see Fig. 1). Shaft 31, through a suitable step up mechanism, drives the generator or magneto armature of an electric tachometer. This device comprises a generator or magneto 32, which is electrically connected to an indicating voltmeter 33 provided with the usual dial 34 and indicating finger 35. The finger 35 is moved in accordance with variations in the voltage generated by the magneto, which depends upon the speed at which it is driven by the paddle wheel, 13, and which, in turn, corresponds to the rate of flow of the stock in the tub of the beater or other container. The indicating finger 35 is electrically connected to a conductor 37 of a supply circuit, as indicated in the diagram in Fig. 3. When the finger 35 reaches the limit of movement to the left, as viewed in Figs. 2 and 3, it engages a contact 38, thereby closing a circuit from the line 37 through the finger 35, contact 38, conductor 39, and lamp 40 to the other line wire 41. It is to be understood that a movement of the finger 35 to the left indicates a decrease in speed, hence the illumination of the lamp 40 affords to the operator an indication that the density of the stock has increased. If the consistency of the stock is being regulated by hand, the operator may then open valve 43, in pipe line, 42, to admit water to the container until the stock is sufficiently diluted. Should the indicating finger 35 move to the right, it will indicate an increase in the rate of stock travel and a corresponding lowering of the consistency of the stock. In this case, the finger, 35, will engage contact, 51, (see Fig. 3) closing a circuit through conductor, 52, lamp, 53, and conductor, 53', and the main supply lines. The illumination of lamp, 53, will immediately indicate to the operator that the consistency of the stock is too low and he may dump a few laps of pulp into the tub to raise the consistency to the desired point.

In accordance with my invention, means are also preferably provided for automatically controlling the consistency of the stock. The pipe 42 which supplies water to the container and is provided, as above described, with a hand-operated valve, 43, may be provided with a second valve 44 which is automatically operated by a reversible motor 45. At the same time that the indicating finger 35 engages the contact 38, a circuit is also closed through a relay 46 and through a conductor 47 to the supply line 41. The energization of the relay 46 causes a contact member 48 to engage contacts 49, closing a circuit through a reversing switch, indicated generally at 50, to the motor 45, and thereby opening the valve to admit water to the stock and bring the consistency thereof back to normal. As the consistency of the stock is reduced the indicating hand, 35, swings to the right and, when it reaches the point indicating normal consistency, may be arranged to close a circuit through contact, 51, and relay, 54. The energization of relay, 54, causes the element, 55, to connect contacts, 56, thereby actuating the reversing switch 50 to close the valve.

In actual practice where means is provided for the automatic control of stock density, either hand valve 43 or the by-pass, with which many motor operated valves are equipped, is set to permit enough water to flow constantly into the tub to supply the minimum requirements thereof. When laps of stock, for example, are added to the stock in the tub and the normal supply of water is insufficient to main the standard density, additional water is supplied through the automatic valve. In this way the consistency of the stock is never permitted to fall substantially below a predetermined minimum, and if it exceeds a predetermined maximum the condition is immediately corrected by automatic dilution.

While I have described the operation of the indicating hand 35 as itself actually making the necessary electrical contacts with points 38 and 51, it is to be understood that the hand itself may generally move beyond either point and that the contacts are made when the hand reaches predetermined points at either side of its normal position by means well known in the art rather than by the hand itself.

If desired, in addition to or without an indicating tachometer, a recording tachometer 62 may be employed to inscribe a record of the variations in consistency of the stock. A dial, 63, is rotated by clock work, as is well understood in the art, and a stylus arm, 35', is actuated in accordance with the speed of the tachometer magneto which is inversely proportional to the density of the stock. When the beater is stopped or started the time thereof is recorded on the chart so that a graphic history is made of each day's operation of the beater.

While I have described and illustrated my invention particularly in connection with determining, indicating and recording the consistency of paper stock in a beating engine, it is obvious that the principles herein disclosed are applicable to any fluent material. The essence of my invention resides in the discovery that the resistance to flow of any material is a function of the density, consistency or specific gravity thereof, and that these characteristics may be determined by measuring the rate of flow or the resistance to flow of the material.

It is therefore to be understood that the words which I have used are words of description rather than of limitation and that changes within the purview of the appended claims may be made without departing from the true scope and spirit of my invention in its broader aspects.

What I claim is:

1. In combination, a container provided with a passage in which fluent material is adapted to flow, a paddle wheel adapted to float upon the surface of the material in said passage and rotatable at a speed varying substantially in accordance with the rate of flow of said material, and means operable in accordance with variations in speed of said paddle wheel for varying the density of said material.

2. In combination, a container provided with a passage in which fluent material is adapted to flow, a rotatable member adapted to float upon the surface of said material and rotatable thereby at a speed varying substantially in accordance with the rate of flow of said material, means responsive to the rise and fall of said rotatable member for indicating the depth of the material in said passage and means operable in accordance with variations in speed of said member for indicating the density of the material.

3. In combination, a container provided with a passage in which fluent material is adapted to flow, a rotatable member adapted to float upon the surface of said material and rotatable thereby at a speed varying substantially in accordance with the rate of flow of said material, means responsive to the rise and fall of said rotatable member for indicating the depth of the material in said passage and means operable in accordance with variations in speed of said member for recording the density of the material.

4. In combination, a container provided with a passage in which fluent material is adapted to flow, a rotatable member adapted to float upon the surface of said material and rotatable thereby at a speed varying substantially in accordance with the rate of flow of said material, means responsive to the rise and fall of said rotatable member for indicating the depth of the material in said passage and means operable in accordance with variations in speed of said member for controlling the density of the material.

5. In combination, a container provided with a passage in which fluent material is adapted to flow, a paddle wheel adapted to float upon the surface of the material in said passage and rotatable at a speed varying substantially in accordance with the rate of flow of material, and electrically operated means operable in accordance with variations in speed of said rotary member for varying the density of said material.

6. In combination, a container provided with a passage in which fluent material is adapted to flow, a rotatable member adapted to float upon the surface of said material and rotatable thereby at a speed varying substantially in accordance with the rate of flow of said material, means for introducing a diluent to said material, and means responsive to variations in the rotary speed of said member for varying the quantity of diluent introduced to the material.

7. In combination, a container provided with a passage therein, means for creating a flow of liquid material through said passage, a rotatable member in said passage driven by said material at a rate substantially in accordance with the rate of flow thereof, means for maintaining said member at a substantially fixed elevation in relation to the surface of said material, and means operable in accordance with variations in the speed of said member for indicating the density of the material.

8. In combination, a container provided with a passage therein, means for creating a flow of liquid material through said passage, a rotatable member in said passage driven by said material at a rate substantially in accordance with the rate of flow thereof, means for maintaining said member at a substantially fixed elevation in relation to the surface of said material, and means operable in accordance with variations in the speed of said member for recording the density of the material.

9. In a device for indicating the consistency of paper stock, means forming a channel disposed in a substantially horizontal plane through which said stock may flow, means for creating a gravity head on said material whereby it will flow through said channel, and means comprising an element continuously movable by said flowing stock for indicating the consistency thereof.

10. In a device for indicating the consistency of paper stock, means forming a conduit through which the stock may flow, and means comprising an element floating upon and continuously movable by said flowing stock for indicating the consistency thereof.

11. In a device for indicating the consistency of paper stock, means forming a passageway for the flow of the stock therethrough, and means comprising a rotatable element floating upon and continuously movable by said flowing stock for indicating the consistency thereof.

12. In a device for indicating the consistency of paper stock, means forming a passageway for the flow of the stock therethrough, and means comprising a rotatable element floating upon and movable by said flowing stock at a peripheral speed substantially proportional to the rate of flow thereof for indicating the consistency of said stock.

13. In a device for indicating the consistency of a liquid material, means forming a passageway for the flow of liquid material therethrough, means comprising an element floating upon and continuously movable by said flowing material and means for indicating the rate of movement of said element whereby the density of said material is determined.

14. In a device for regulating the consistency of a liquid material, means forming a conduit for the flow of liquid material therethrough, means comprising an element floating upon and continuously movable by said flowing material and automatic means responsive to variations in the rate of movement of said element for regulating the consistency of said material.

15. In a device for regulating the consistency of a liquid material, means forming a passageway for the flow of liquid material therethrough, means comprising an element floating upon and continuously rotated by said flowing material and automatic means responsive to variations in the rate of rotation of said element for regulating the consistency of said material.

16. In a device for regulating the consistency of a liquid material, means forming a passageway for the flow of material therethrough, means comprising a rotatable element floating upon and continuously rotated by said flowing material at a rate proportional to the surface speed thereof and automatic means operable in response to variations in the rate of rotation of said element for regulating the flow of a diluent to said material.

17. In combination, a container provided with a passage in which fluent material is adapted to flow, a rotatable member floating upon said material movably mounted for up and down movement whereby said member rises and falls with the surface of said material, said member being driven by said material at a speed varying substantially in accordance with the rate of flow thereof, means for providing for the upward and downward movement of said member, and means operable in accordance with variations in the rate of speed of said member for indicating the consistency of said material.

18. In combination, a container provided with a passage in which fluent material is adapted to flow, a rotatable member adapted to float upon the surface of said material and movably mounted for up and down movement whereby said member rises and falls with the surface of said material, said member being driven by said material at a speed varying substantially in accordance with the rate of flow thereof, and means operable in accordance with variations in the rate of speed of said member for recording the consistency of said material.

19. In combination, a container provided with a passage in which fluent material is adapted to flow, a rotatable member adapted to float upon the surface of said material and movably mounted for up and down movement whereby said member rises and falls with the surface of said material, said member being driven by said material at a speed varying substantially in accordance with the rate of flow thereof, and means operable in accordance with variations in the rate of speed of said member for regulating the consistency thereof.

20. In combination, a container provided with a passage in which fluent material is adapted to flow, a rotatable member floating upon said material, movably mounted for up and down movement whereby said member rises and falls with the surface of said material, said member being driven by said material at a speed varying substantially in accordance with the rate of flow thereof, means responsive to the rise and fall of said rotatable member for indicating the depth of material in said passage, and means operable in accordance with variations in the rate of speed of said member for indicating the consistency of said material.

21. In combination, a container provided with a passage in which fluent material is adapted to flow, a rotatable member adapted to float upon the surface of said material and movably mounted for up and down movement whereby said member rises and falls with the surface of said material, means responsive to the rise and fall of said rotatable member for indicating the depth of material in said passage, said member being driven by said material at a speed varying substantially in accordance with the rate of flow thereof, and means operable in accordance with variations in the rate of speed of said member for recording the consistency of said material.

22. In combination, a container provided with a passage in which fluent material is adapted to flow, a rotatable member adapted to float upon the surface of said material and movably mounted for up and down movement whereby said member rises and falls with the surface of said material, means responsive to the rise and fall of said rotatable member for indicating the depth of material in said passage, said member being driven by said material at a speed varying substantially in accordance with the rate of flow thereof, and means operable in accordance with variations in the rate of speed of said member for regulating the consistency thereof.

23. In combination, a container provided with a passage in which fluent material is adapted to flow a rotatable member adapted to float upon the surface of the material in said passage and rotatable at a speed varying substantially in accordance with the rate of flow of said material, and means operable in accordance with variations in speed of said rotary member for varying the density of said material.

GEORGE S. WITHAM, Jr.